(12) United States Patent
Yamaguchi et al.

(10) Patent No.: US 8,154,681 B2
(45) Date of Patent: Apr. 10, 2012

(54) DISPLAY APPARATUS AND ELECTRONIC APPARATUS HAVING THE DISPLAY APPARATUS

(75) Inventors: Goki Yamaguchi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/285,506

(22) Filed: Oct. 7, 2008

(65) Prior Publication Data

US 2009/0244437 A1   Oct. 1, 2009

(30) Foreign Application Priority Data

Mar. 27, 2008   (JP) ................. 2008-084202

(51) Int. Cl.
    *G02F 1/1333* (2006.01)
(52) U.S. Cl. .......................... 349/60; 349/58
(58) Field of Classification Search .............. None
    See application file for complete search history.

(56) References Cited

U.S. PATENT DOCUMENTS

| | | | |
|---|---|---|---|
| 6,429,912 B2* | 8/2002 | Nagasaki | 349/58 |
| 6,606,132 B2* | 8/2003 | Giannatto | 349/58 |
| 6,608,664 B1* | 8/2003 | Hasegawa | 349/160 |
| 7,102,702 B2* | 9/2006 | Peng | 349/58 |
| 7,545,457 B2* | 6/2009 | Park | 349/58 |
| 7,652,729 B2 | 1/2010 | Minaguchi | |
| 2002/0126461 A1* | 9/2002 | Yazaki | 361/752 |
| 2008/0151502 A1* | 6/2008 | Shives et al. | 361/704 |

FOREIGN PATENT DOCUMENTS

| | | |
|---|---|---|
| CN | 1755580 | 4/2006 |
| CN | 101101395 | 1/2008 |
| JP | 2003-114735 | 4/2003 |
| JP | 2004-163682 | 6/2004 |
| JP | 2004-361615 | 12/2004 |

OTHER PUBLICATIONS

State Intellectual Property Office of China, Office Action issued Aug. 31, 2010 for Chinese Patent Application No. 200810170679.3, with translation.

* cited by examiner

*Primary Examiner* — Tina Wong
(74) *Attorney, Agent, or Firm* — Fujitsu Patent Center (57) ABSTRACT

A display apparatus includes a front cover, a display panel, a rear cover configured to receive, with the front cover, the display panel, and a sheet member sandwiched by the display panel and the rear cover, the sheet member having a conductivity and shock absorption and vibration absorption properties.

10 Claims, 10 Drawing Sheets

DISPLAY APPARATUS AND ELECTRONIC APPARATUS HAVING THE DISPLAY APPARATUS

BACKGROUND OF THE INVENTION

1. Field of the Invention

The present invention generally relates to display apparatuses and electronic apparatuses having the display apparatuses. More specifically, the present invention relates to a display apparatus having a structure where generation of abnormalities on a display screen is prevented while good antenna properties are maintained, and an electronic apparatus having the display apparatus.

2. Description of the Related Art

Accompanying the recent development of the information society, various kinds of electronic apparatuses such as a personal computer have been widely used. In particular, a portable type electronic apparatus which can be used even outside is in demand. Hence, small size and light weight of such electronic apparatuses are desired. As a means for achieving such a goal, a display apparatus where a liquid crystal panel as a display panel is applied has been widely used. In the liquid crystal display apparatus, not only small size and light weight but also low consumption of electric power can be achieved by the portable electronic apparatus driven by a battery. In other kinds of display panels such as plasma panels and organic EL (Electro-Luminescence) panels, small size, light weight and low consumption of electric power have also been developed.

Figure 1:
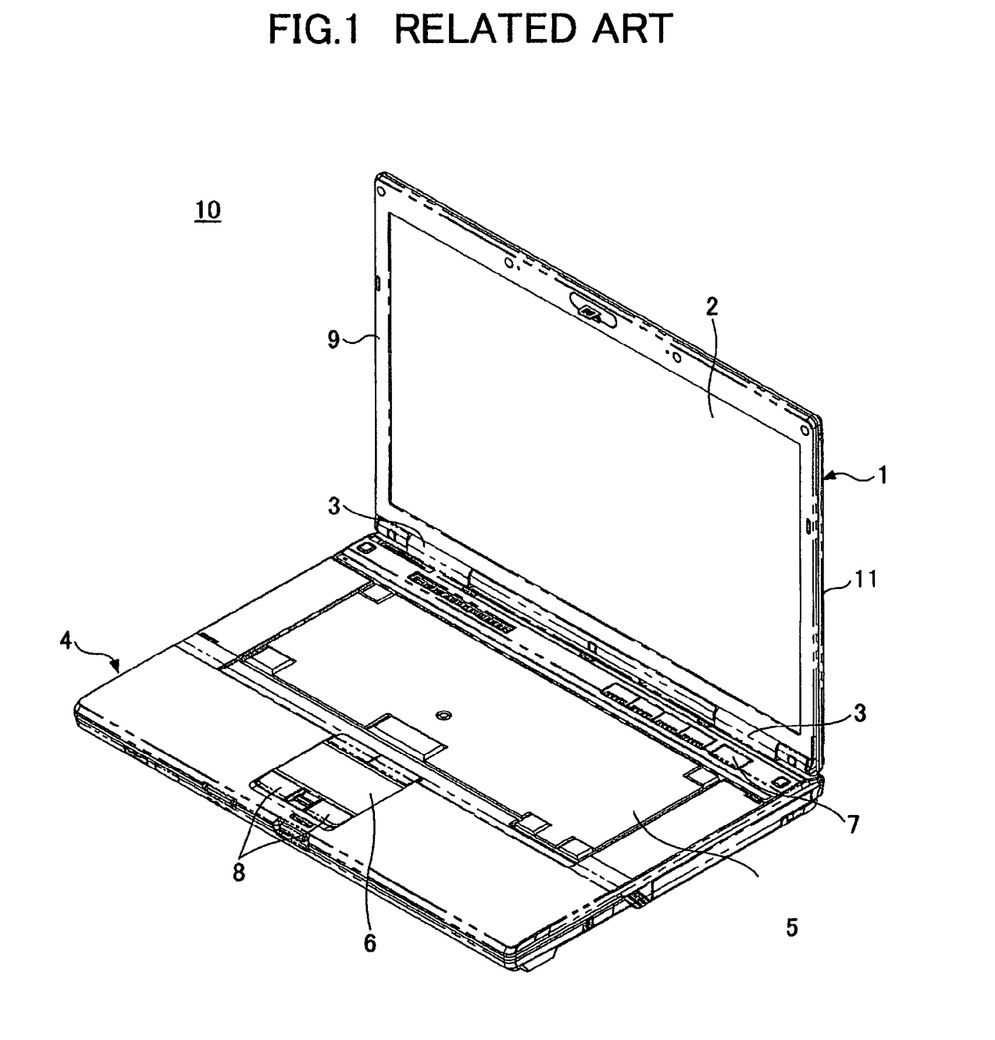
FIG. 1 is a perspective view of a notebook type personal computer.

FIG. 1 is a perspective view of a notebook type personal computer as an example of a portable electronic apparatus.

As shown in FIG. 1, in a notebook personal computer 10, a liquid crystal display apparatus 1 is rotatably attached to a computer main body 4 with hinges 3 so that a display surface of a liquid crystal panel 2 faces inside (upper surface of the computer main body 4). In an example shown in FIG. 1, the liquid crystal display 1 is opened against the computer main body 4 so that a display surface of the liquid crystal panel 2 can be seen.

A keyboard 5 (illustration of its details is omitted), a touch pad 6, an electric power button 7, click buttons 8, and others are provided on the upper surface of the computer main body 4. In addition, there is a motherboard where a CPU (Central Processing Unit), a hard disk, and other components are provided inside the computer main body 4.

Figure 2:
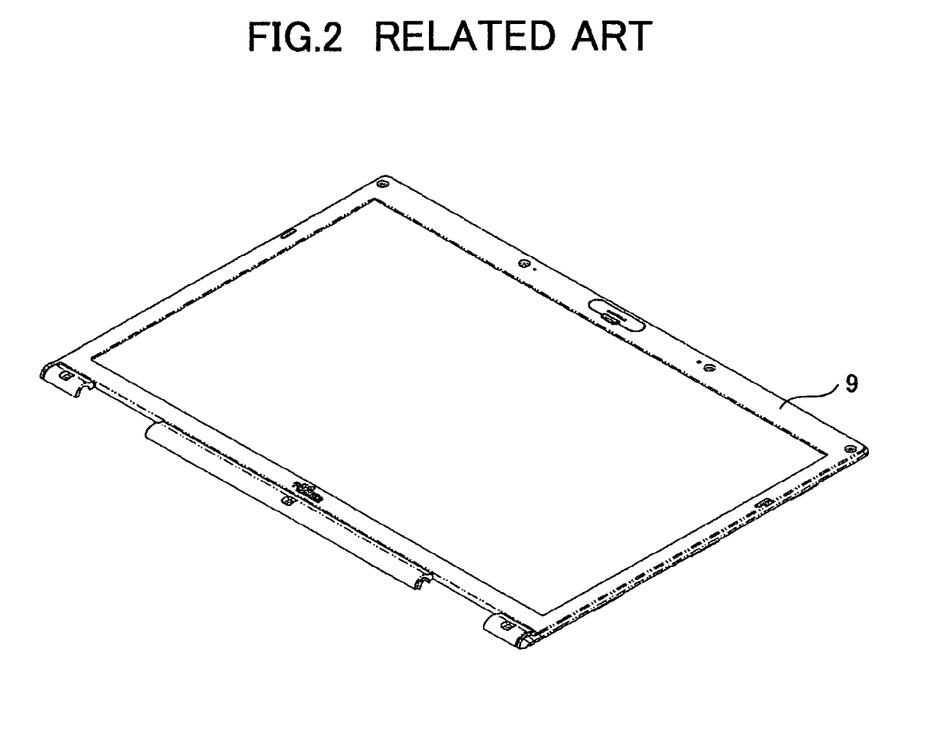
FIG. 2 is a perspective view of a front cover of a liquid crystal display apparatus of the notebook personal computer shown in FIG. 1.

The liquid crystal display apparatus 1 includes a front cover 9 (see FIG. 2) and a rear cover 11. The liquid crystal panel 2 is received between the front cover 9 and the rear cover 11. FIG. 2 is a perspective view of the front cover 9 of the liquid crystal display apparatus 1.

Figure 3:
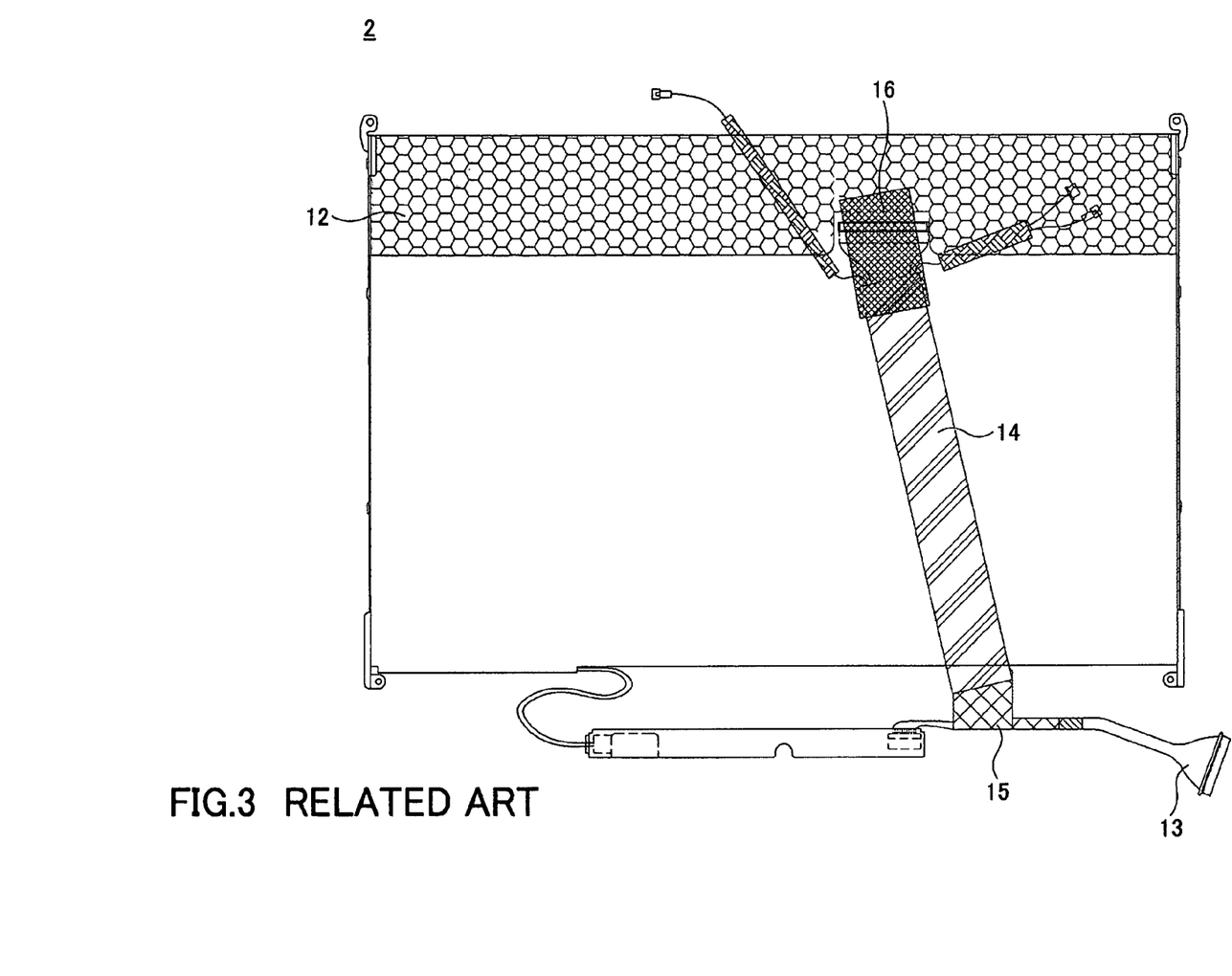
FIG. 3 is a plan view of a rear surface of a liquid crystal panel of the liquid crystal display apparatus.

In the meantime, an antenna 30 (see FIG. 4) is provided on the display surface of the liquid crystal panel 2. The antenna 30 is configured to perform radio communication. The antenna 30 is shielded by an electromagnetic shield part so as to eliminate noise and maintain good antenna properties of the antenna. This is discussed with reference to FIG. 3. Here, FIG. 3 is a plan view of the rear surface of the liquid crystal panel 2.

An insulation sheet is formed on the substantially entire rear surface of the liquid crystal panel 2. An aluminum sheet 12 is adhered on the insulation sheet at an upper part of the liquid crystal panel 2. The aluminum sheet 12 is adhered on the insulation sheet by peeling a release sheet provided to the aluminum sheet 12.

In addition, an LCD cable formed of plural wirings is provided at the rear surface of the liquid crystal panel 2. A connector 13 is provided at an end of the LCD cable. The connector 13 is configured to connect to a board provided at the main cover 4 (see FIG. 1). The LCD cable is covered with a copper (Cu) tape 14. In addition, a conductive fabric 15 is wound around a portion in the vicinity of the connector 13 of the wirings. A conductive fabric 16 is adhered at a portion in the vicinity of the aluminum sheet 12. This connecter 13 is connected to a connector provided at the above-mentioned motherboard. An image signal indicating an image formed by the CPU is supplied to the board via the connector 13 and the LCD cable. The board is configured to control driving of the liquid crystal panel 2 as corresponding to the supplied image signal and display the image on the liquid crystal panel 2.

Thus, at the rear surface of the liquid crystal panel 2, the aluminum sheet 12, the conductive fabric 15, and the conductive fabric 16 work as the electromagnetic shield part configured to eliminate noise and maintain good antenna properties of the antenna.

Figure 4:
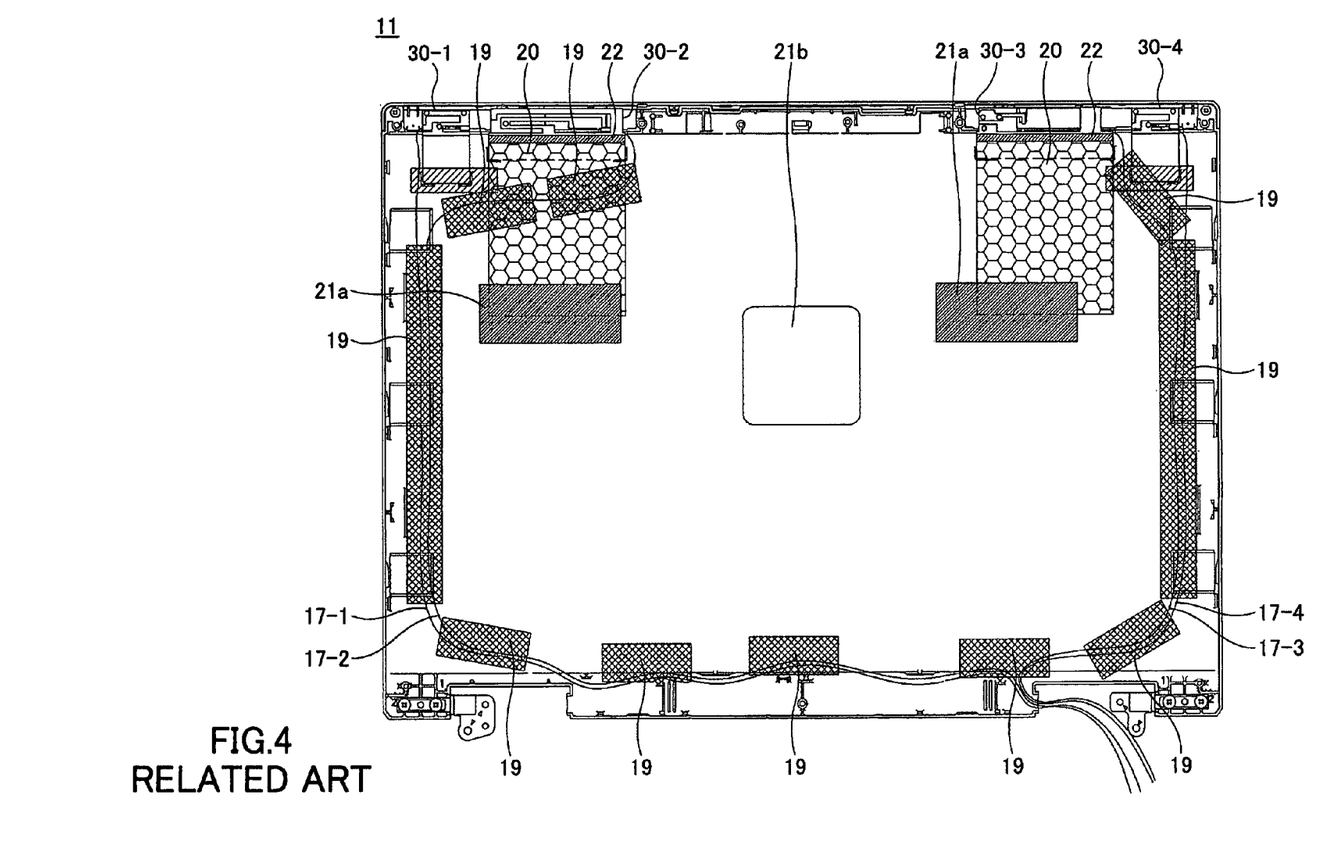
FIG. 4 is a plan view of an internal surface of a liquid crystal panel of the liquid crystal display apparatus.

Next, a structure of an internal surface of the rear cover 11 is discussed with reference to FIG. 4. Here, FIG. 4 is a plan view of the internal surface of the rear cover 11.

The antenna cables 17-1 through 17-4 are adhered on the internal surface of the rear cover 11 along an external circumference of the internal surface of the rear cover 11 via a conductive fabric 19.

Figure 5:
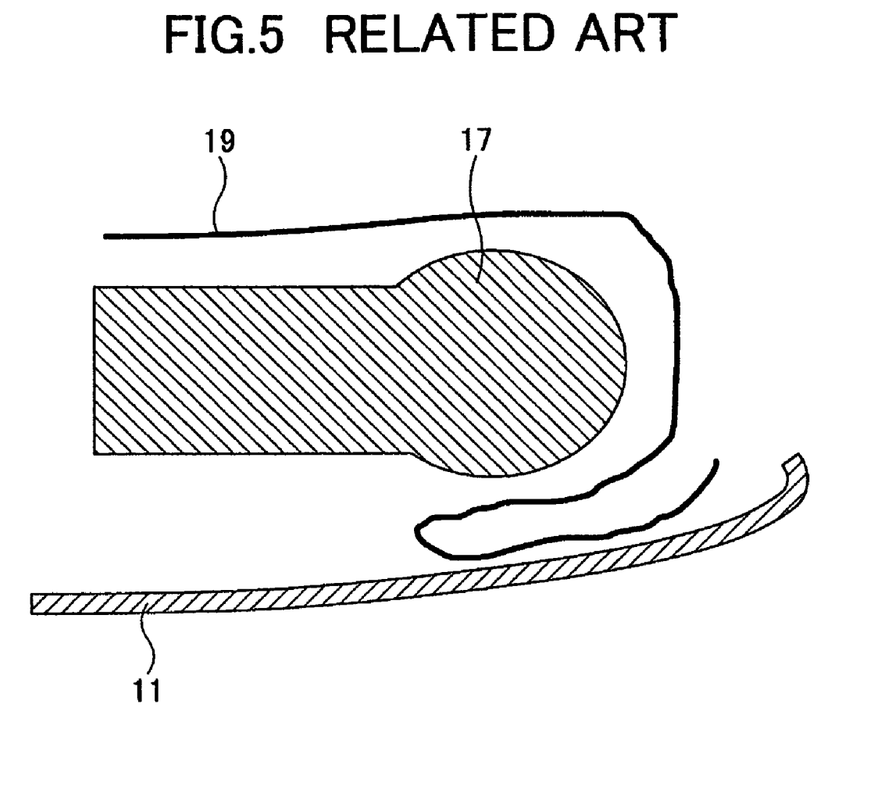
FIG. 5 is a cross-sectional view of an LCD cable adhered to an internal surface of a rear cover via conductive fabric.

FIG. 5 is a cross-sectional view of the LCD cable 17 adhered to the internal surface of the rear cover 11 via conductive fabric 19. As shown in FIG. 5, an adhesive surface of the conductive fabric 19 comes in contact with the internal surface of the rear cover 11 and the LCD cable 17. In order to prevent the LCD cable 17 from being taken off, the adhesive surface of the conductive fabric 19 is adhered on the internal surface of the rear cover 11.

Referring back to FIG. 4, aluminum sheets 20 are adhered on the upper part of the internal surface of the rear cover 11. The aluminum sheet 20 is, for example, adhered by peeling a release sheet provided to the aluminum sheet 20.

Thus, at the internal surface of the rear cover 11, the conductive fabric 19 and the aluminum sheet 20 work as the electromagnetic shield part configured to eliminate noise and maintain good antenna properties of the antenna.

In addition, sponge type projection type cushion materials 21 and 22 are provided on the internal surface of the rear cover 11 via two-sided tape. When a force is applied from the rear side of the liquid crystal panel 2, an abnormality may be generated on the screen of the liquid crystal panel 2. However, by the cushions 21a and 21b adhered in the vicinity of the aluminum sheets 20 and the substantially center part of the internal surface of the rear cover 11, it is possible to prevent a white point image defect from being generated on the screen of the liquid crystal panel 2. In addition, by the cushion 22 adhered on the upper part of the internal surface of the rear cover 11, it is possible to prevent generation of liquid crystal cracks due to the spread of black strain on the screen of the liquid crystal panel 2.

Thus, the cushions 21 and 22 are provided on the internal surface of the rear cover 11, so that generation of abnormalities on the screen of the liquid crystal panel 2 is prevented.

In addition to the above-mentioned example, a portable type information processing apparatus having the following structure where an antenna is electromagnetically shielded is suggested. See Japanese Laid-Open Patent Application Publication 2003-114735. A plane surface type antenna is detachably provided between a rear surface of a liquid crystal screen and a display part housing by two-sided tape provided in the display housing. A metal sheet covers between an antenna surface and the rear surface of the liquid crystal screen.

Furthermore, a liquid crystal display apparatus having a structure where noise of a liquid crystal panel is attenuated by a conductive sheet has been suggested. See Japanese Laid-Open Patent Application Publication 2004-361615. In this liquid crystal display apparatus, a projecting part which projects to a rear surface side of the liquid crystal display panel is provided at an attaching part. The attaching part is attached to a side surface of the liquid crystal panel. An end part of the attaching part extends from the side surface. A cantilever plate spring part is formed at a conductive sheet provided between the housing and the liquid crystal panel. The plate spring part is comes in elastic contact with the projection part of the attaching part.

However, in the liquid crystal display apparatus 1 shown in FIG. 1 through FIG. 4, as discussed above, the aluminum sheet 12, the conductive fabric 15, and the conductive fabric 16 are provided on the rear surface of the liquid crystal panel 2 as the electromagnetic shield part configured to eliminate noise and maintain good antenna properties of the antenna. In addition, the conductive fabric 19 and the aluminum sheet 20 are provided on the internal surface of the rear cover 11 as the electromagnetic shield part configured to eliminate noise and maintain good antenna properties of the antenna.

In addition, in order to prevent the abnormalities from being generated on the screen of the liquid crystal panel 2, the cushion members 21 and 22 are provided on the internal surface of the rear cover 11.

In other words, in the liquid crystal display apparatus 1 shown in FIG. 1 through FIG. 4, the electromagnetic shield member and the part configured to prevent the abnormalities from being generated on the screen of the liquid crystal panel 2 are separately provided. Accordingly, the number of components of the liquid crystal display apparatus 1 is large. Hence, the number of steps of assembling the liquid crystal display apparatus 1 is large and therefore it is difficult to make the manufacturing cost of the liquid crystal display apparatus 1 low.

SUMMARY OF THE INVENTION

Accordingly, embodiments of the present invention may provide a novel and useful display apparatus and electronic apparatus having the display apparatus solving one or more of the problems discussed above.

One aspect of the present invention may be to provide a display apparatus, including a front cover, a display panel, a rear cover configured to receive, with the front cover, the display panel; and a sheet member sandwiched by the display panel and the rear cover, the sheet member having a conductivity and shock absorption and vibration absorption properties.

Another aspect of the present invention may be to provide an electronic apparatus, including a display apparatus, and a main body where the display apparatus is rotatably provided, wherein the display apparatus includes a front cover, a display panel, a rear cover configured to receive, with the front cover, the display panel, and wherein a sheet member sandwiched by the display panel and the rear cover, the sheet member having a conductivity and shock absorption and vibration absorption properties.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

A description is given below, with reference to FIG. 6 through FIG. 10 of embodiments of the present invention.

In the following explanation, a notebook type personal computer is discussed as an electronic apparatus of an embodiment of the present invention.

Figure 6:
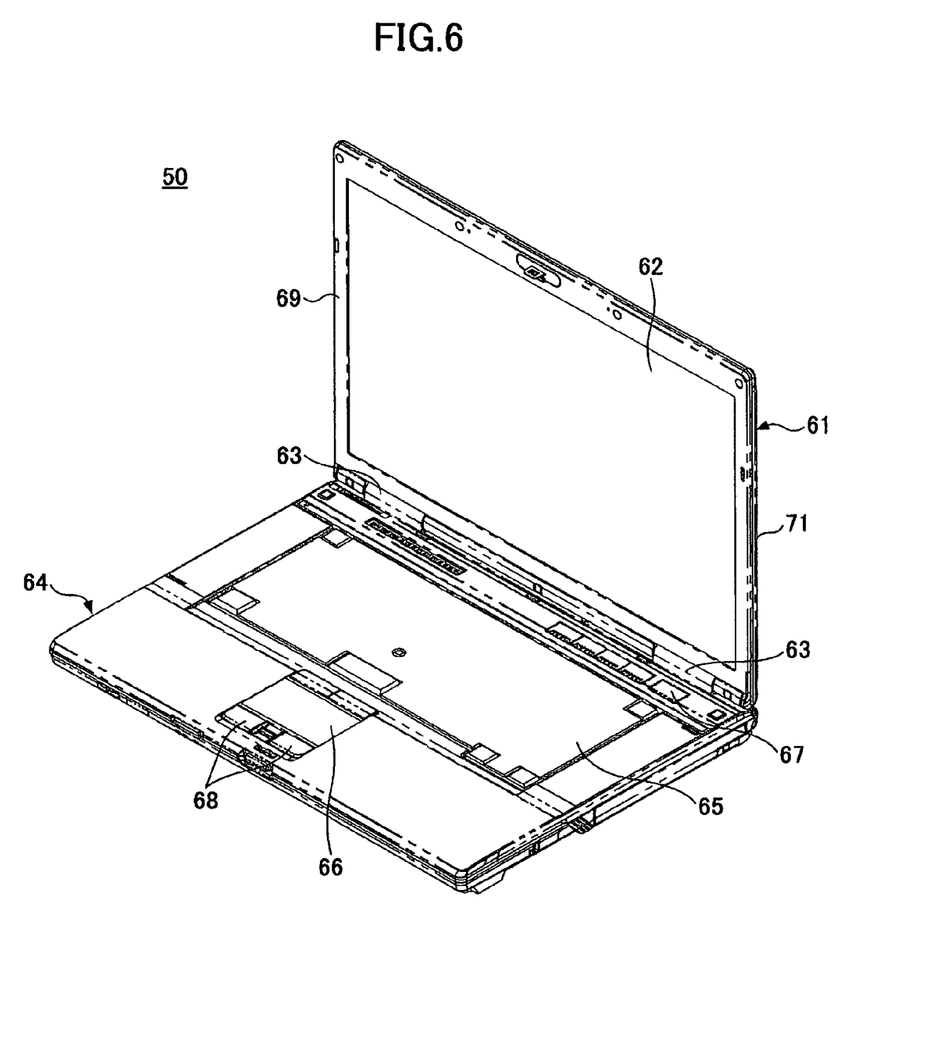
FIG. 6 is a perspective view of a notebook personal computer of an embodiment of the present invention.

FIG. 6 is a perspective view of a notebook personal computer of an embodiment of the present invention.

In the notebook personal computer 50, a liquid crystal display apparatus 61 is rotatably attached to a computer main body 64 via hinges 63 in a state where a display surface of a liquid crystal panel 62 faces inside, namely an upper surface of the computer main body 64.

In an example shown in FIG. 6, the liquid crystal display 61 is opened at an arbitrary angle with the computer main body 64 so that a display surface of the liquid crystal panel 62 can be seen. In the embodiment of the present invention, a display apparatus having a liquid crystal panel as an example of the display panel is discussed.

A keyboard 65 (illustration of its details is omitted), a touch pad 66, an electric power button 67, click buttons 68, and other are provided on the upper surface of the computer main body 64. In addition, there is a not-shown motherboard where a CPU (Central Processing Unit), a hard disk, and other components are provided inside the computer main body 64.

Figure 7:
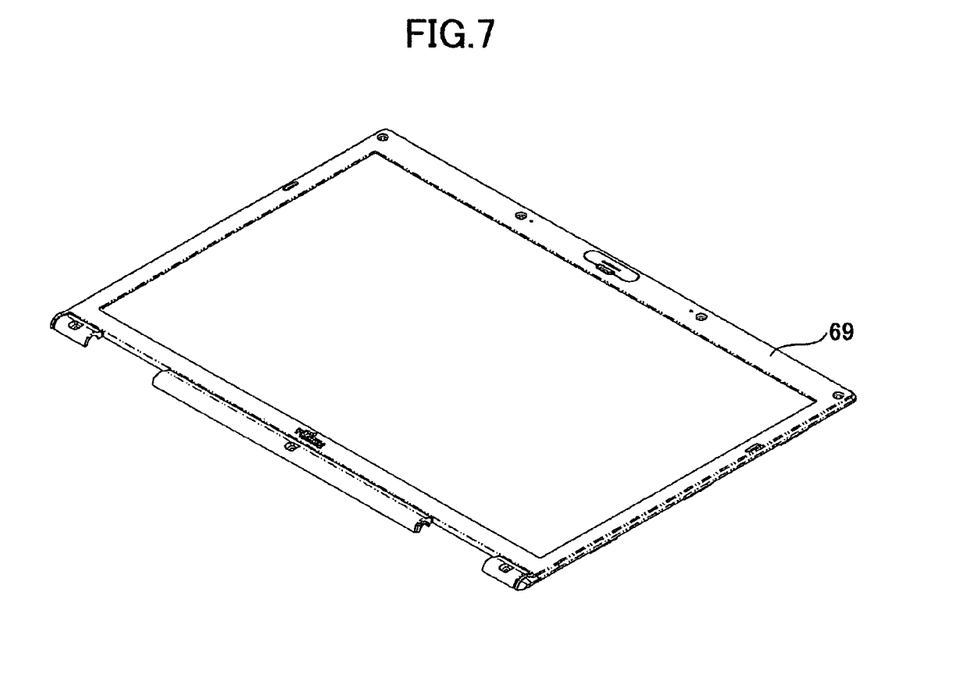
FIG. 7 is a perspective view of a front cover of a liquid crystal display apparatus of the notebook personal computer shown in FIG. 6.

The liquid crystal display apparatus 61 includes a front cover (see FIG. 7) 69 and a rear cover 71. The liquid crystal panel 62 is received between the front cover 69 and the rear cover 71. FIG. 7 is a perspective view of the front cover 69 of the liquid crystal display apparatus 61.

In the liquid crystal display apparatus 61 of the embodiment of the present invention, a sheet member 80 is sandwiched between the liquid crystal panel 62 and the rear cover 71.

Figure 8:
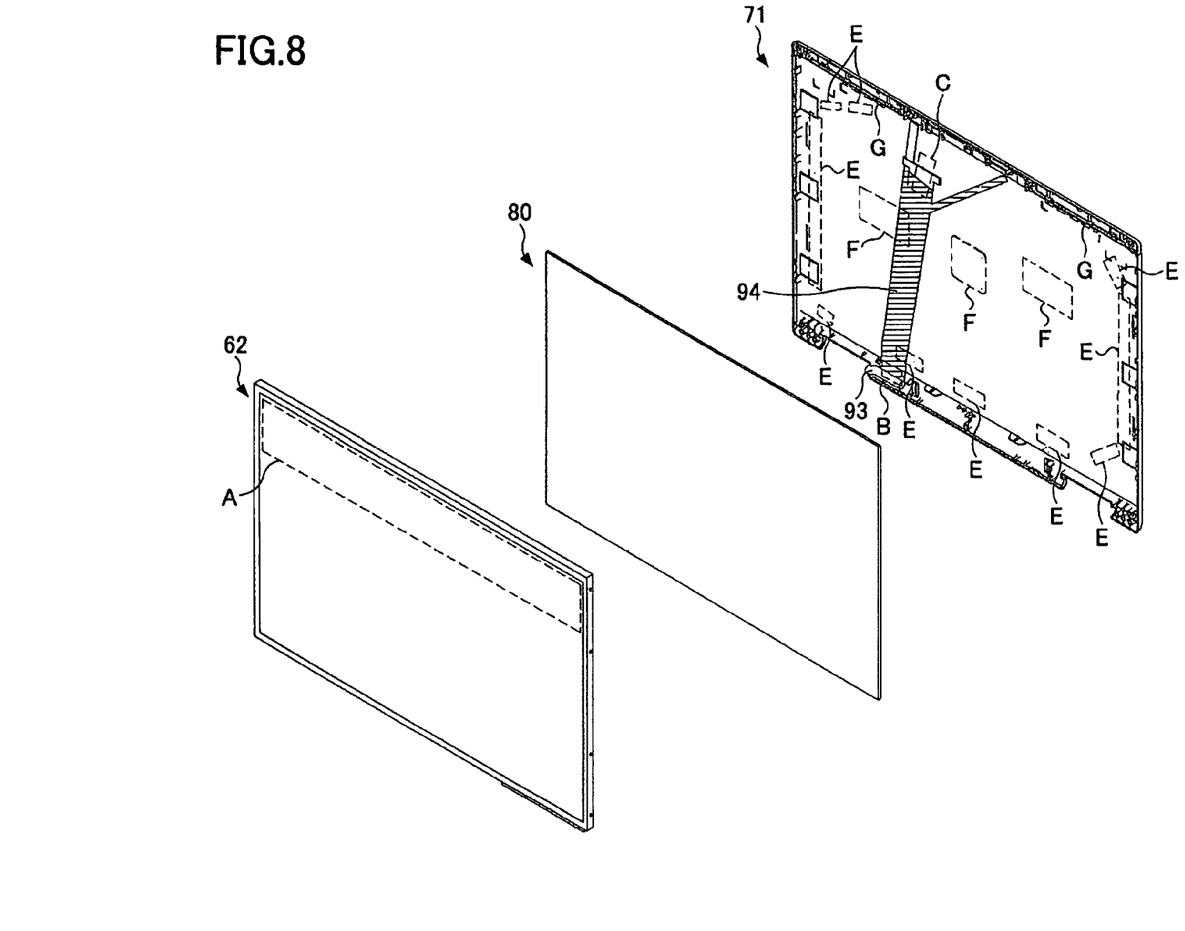
FIG. 8 is a perspective view of a liquid crystal panel, a rear cover, and a sheet member of the liquid crystal display apparatus of the embodiment of the present invention.

FIG. 8 is a perspective view of the liquid crystal panel 62, the rear cover 71, and the sheet member 80 sandwiched between the liquid crystal panel 62 and the rear cover 71.

In FIG. 8, for the convenience of understanding, an LCD cable is shown on the internal surface of the rear cover 71. The LCD cable is formed of plural wirings and covered with a tape 94 made of copper (Cu). A connector 93 is provided at an end part of the LCD cable. However, actually, the LCD cable is provided on a rear surface of the liquid crystal panel 62. The connector 93 is connected to a connector provided on the not-shown motherboard. Image signals indicating an image generated by the CPU are supplied to a not-shown board via these connectors and the LCD cable. The board drives the liquid crystal panel 62 corresponding to the supplied image signals and display of the image is performed by the liquid crystal panel 62.

In the liquid crystal panel 62 shown in FIG. 8, a portion surrounded by a dotted line A indicates a corresponding portion of the liquid crystal panel 2 shown in FIG. 3 where the aluminum sheet 12 is adhered.

In the embodiment of the present invention, since the sheet member 80 is provided between the liquid crystal panel 62 and the rear cover 71, it is not necessary to provide the aluminum sheet 12 shown in FIG. 3.

Figure 9:
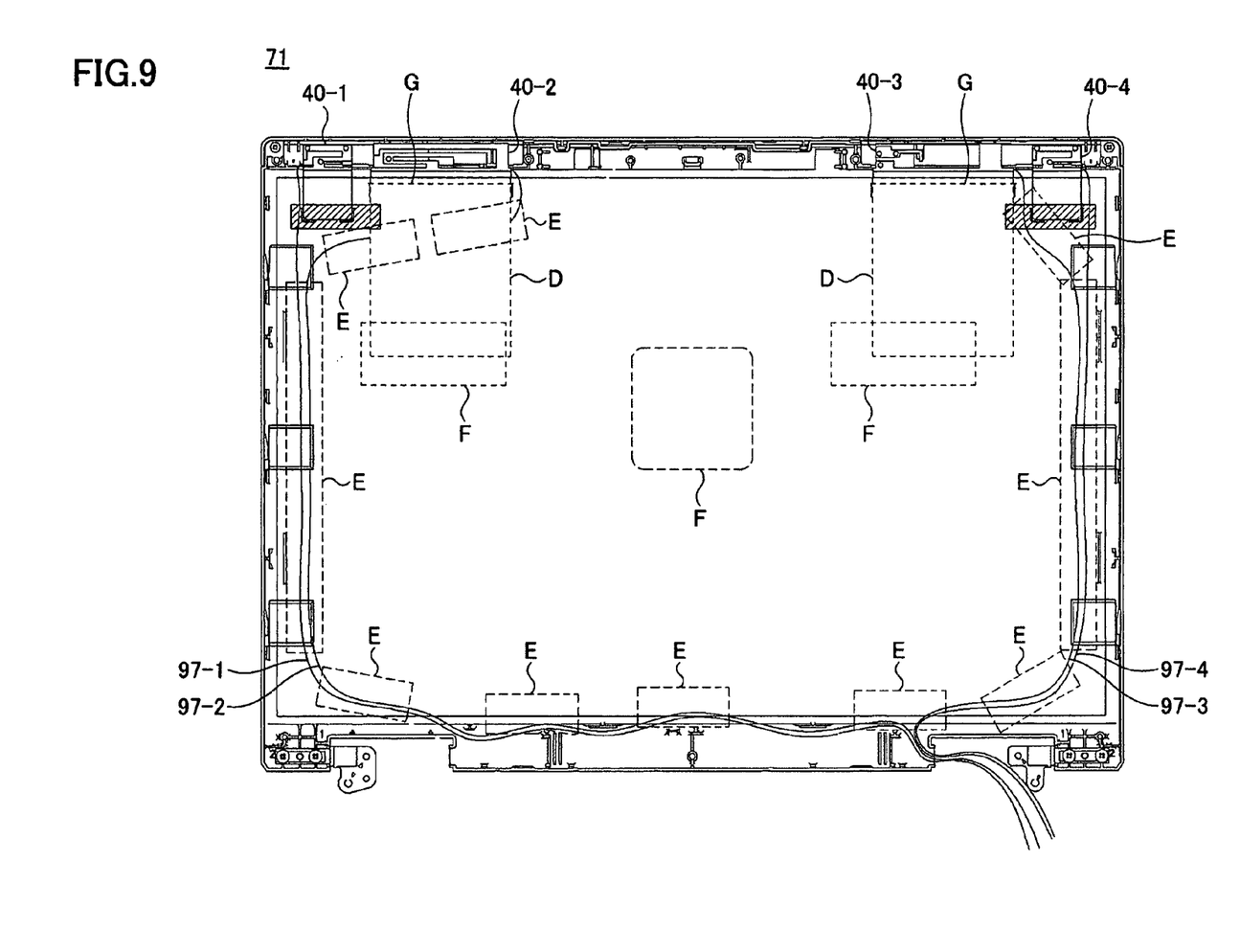
FIG. 9 is an expanded view of the rear cover shown in FIG. 8.

FIG. 9 is an expanded view of the rear cover 71 shown in FIG. 8. As shown in FIG. 8 and FIG. 9, antenna cables 97-1 through 97-4 are provided substantially along the external circumference of the internal surface of the rear cover 71.

In the rear cover 71 shown in FIG. 8, a portion surrounded by a dotted line B corresponds to a portion of the liquid crystal panel 2 shown in FIG. 3 where the conductive fabric 15 is provided. A portion surrounded by a dotted line C corresponds to a portion of the liquid crystal panel 2 shown in FIG. 3 where the conductive fabric 16 is provided. In addition, in the rear cover 71 shown in FIG. 9, a portion surrounded by a dotted line D corresponds to a portion of the rear cover 11 shown in FIG. 4 where the aluminum sheet 20 is provided. Furthermore, in the rear cover 71 shown in FIG. 8 and FIG. 9, a portion surrounded by a dotted line E corresponds to a portion of the rear cover 11 shown in FIG. 4 where the conductive fabric 19 is provided.

As discussed below, in the embodiment of the present invention, since the sheet member 80 is provided between the liquid crystal panel 62 and the rear cover 71, it is not necessary to provide the conductive fabrics 15 and 16 shown in FIG. 3 and the aluminum sheet 20 and the conductive fabric 19 shown in FIG. 4.

In the rear cover 71 shown in FIG. 8 and FIG. 9, a portion surrounded by a dotted line F corresponds to a portion of the rear cover 11 shown in FIG. 4 where the cushion member 21 is provided. A portion surrounded by a dotted line G corresponds to a portion of the rear cover 11 shown in FIG. 4 where the cushion member 22 is provided.

As discussed below, in the embodiment of the present invention, since the sheet member 80 is provided between the liquid crystal panel 62 and the rear cover 71, it is not necessary to provide the cushions 21 and 22 shown in FIG. 4.

Next, the sheet member 80 provided between the liquid crystal panel 62 and the rear cover 71 is discussed.

Two-sided tape is provided on a part of a main surface of the sheet member 80, the surface coming in contact with the rear cover 71. Accordingly, the sheet member 80 is adhered to the rear cover 71 or the liquid crystal panel 62 via the two-sided tape.

The sheet member 80 has properties of both conductivity and shock and vibration absorption. A surface of the sheet member opposite to the adhering surface has minute adhering properties and therefore can be easily provided when the liquid crystal display apparatus 1 is formed. In addition, positional gap due to vibration can be absorbed.

The sheet member 80 may be made of aluminum (Al), stainless steel (SUS), or copper (Cu) having a spring configuration at a necessary part, or formed of a gasket material. In the case where the sheet member 80 is made of aluminum (Al), stainless steel (SUS), or copper (Cu), it is possible to form the sheet member 80 at low cost. In addition, in the case where the sheet member 80 is formed of the gasket material, it is possible to make the weight of the sheet member 80 light.

The sheet member 80 may be made of a composite material formed of a material having conductivity, such as aluminum (Al), copper (Cu), or silver (Ag) and a material having shock absorption and vibration absorption properties such as polyurethane. Aluminum (Al), copper (Cu), silver (Ag), and others have good conductivity. In particular, aluminum (Al) is light weight and therefore it is possible to manufacture the sheet member 80 made of aluminum (Al) at low cost. In addition, polyurethane is light weight and has good cushion properties and durability.

In the example shown in FIG. 8, an area of the main surface of the liquid crystal panel 62 is substantially equal to an area of the main surface of the liquid crystal panel 62. However, the present invention is not limited to this. As long as the sheet member 80 is provided at least at portions indicated by the dotted lines A through G in FIG. 8 and FIG. 9, namely the portions where the conductive fabrics 15, 16 and 19 are conventionally provided, where the aluminum sheets 12 and 20 are conventionally provided, and where the cushion members 21 and 22 are provided in the examples shown in FIG. 3 and FIG. 4, it is not necessary that the area of the sheet member 80 be equal to the area of the main surface of the liquid crystal panel 62.

In addition, as long as the thickness of the sheet member 80 is within a range of the clearance between the liquid crystal panel 62 and the rear cover 71, there is no limitation in the thickness of the sheet member 80.

An antenna 40 (see FIG. 9) configured to perform radio communication is provided outside the rear surface of the display surface of the liquid crystal panel 62. Therefore, it is necessary to eliminate noise and maintain good antenna properties of the antenna. This antenna 40 is fixed to the rear cover 71 which is in the vicinity of the sheet member 80 excluding a portion where the sheet member 80b is positioned in the state where the antenna 40 is located between the rear cover 71 and the front cover 69.

If a force is directly applied from the rear side of the liquid crystal panel 62 to the display surface of the liquid crystal panel 62 when the liquid crystal panel 62 is fixed to the rear cover 71, for example, an abnormality may be generated on the liquid crystal panel 62. For example, a white point image defect may be generated on the screen of the liquid crystal panel 62. A liquid crystal crack due to the spread of black strain may be generated on the screen of the liquid crystal panel 62.

In the embodiment of the present invention, a single sheet of the sheet member 80 having properties of both conductivity and shock and vibration absorption is provided between the liquid crystal panel 62 and the rear cover 71. Accordingly, because of conductivity of the sheet member 80, the antenna is shielded so that good antenna properties of the antenna can be maintained. In addition, the shock is absorbed by the sheet member 80 so that generation of an abnormality on the screen of the liquid crystal panel 62 can be prevented by the sheet member 80 absorbing the shock.

Hence, according to the embodiment of the present invention, compared to examples shown in FIG. 3 and FIG. 4 where plural conductive fabrics and plural aluminum sheets are separately provided on the liquid crystal panel 2 and the rear cover 11, it is possible to decrease the number of components comprising the liquid crystal display apparatus 61 so that the number of steps for assembling the liquid crystal display apparatus 61 can be decreased so that the manufacturing coast can be made low.

In addition, in the embodiment of the present invention, the sheet member 80 is adhered to the rear cover 71 or the liquid crystal panel 62. Therefore, the antenna cables 97-1 through 97-4 may not be provided along the strictly external circumference of the internal surface of the rear cover 71 but may be positioned in the center of the rear cover 71. Accordingly, it is possible to make the arrangement of the antenna cables 97-1 through 97-4 simple.

Thus, according to the embodiments of the present invention, an electromagnetic shield part for eliminating noise and maintaining good antenna properties of the antenna and a part for preventing generation of abnormalities in the screen of the display panel are not individually provided. Instead, a component achieving effects of both the electromagnetic shield part and the part for preventing generation of abnormalities is provided. As a result of this, it is possible to provide a display apparatus whereby the number of components comprising the display apparatus is decreased so that the number of steps for assembling the display apparatus is decreased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

For example, in the above-discussed example, the main surface of the sheet member 80 has a substantially rectangular shaped configuration corresponding to the main surface of the liquid crystal panel 62. However, the present invention is not limited to this.

Figure 10:
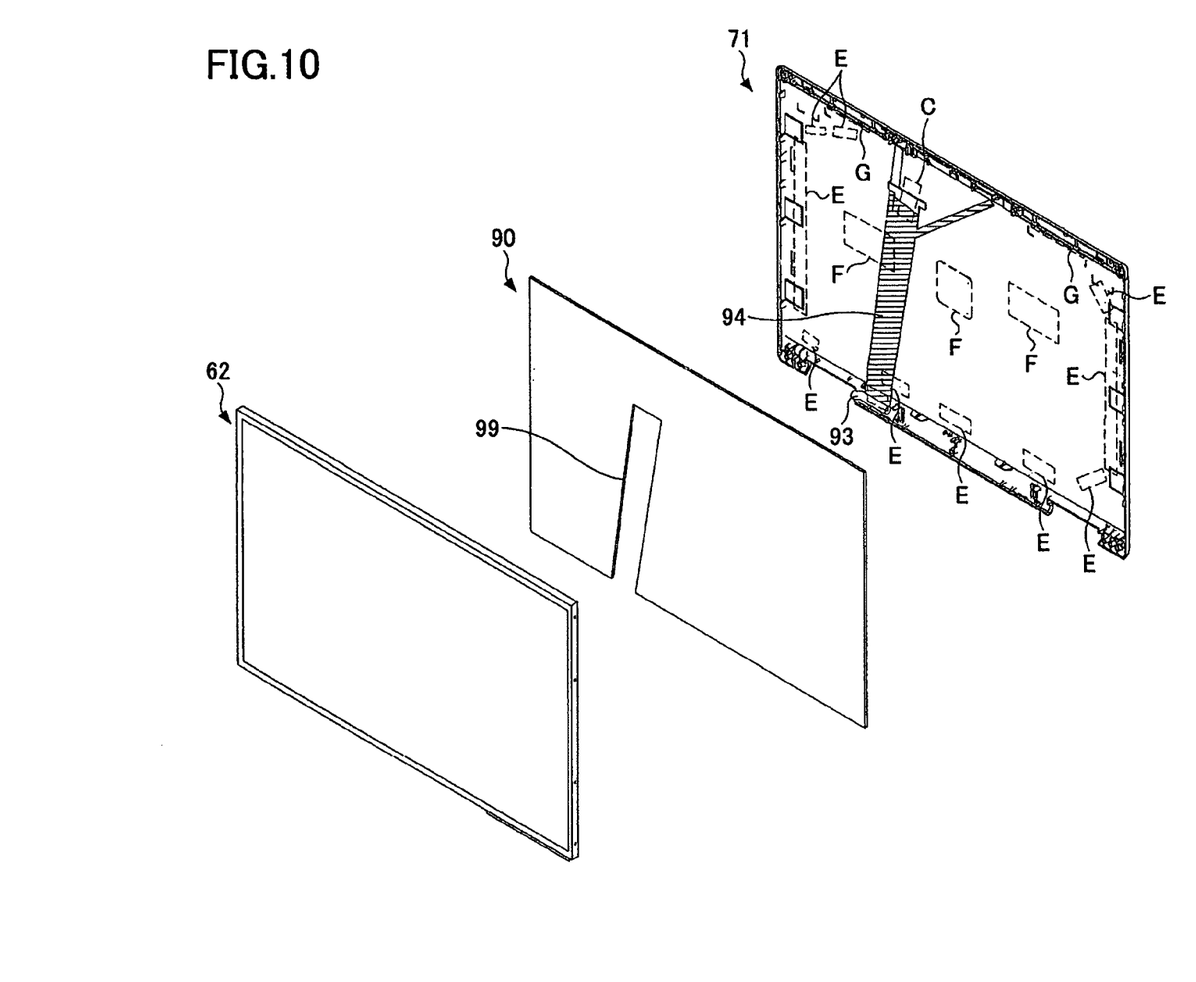
FIG. 10 is a perspective view of a liquid crystal display apparatus including a modified example of the sheet member of the embodiment of the present invention.

Here, FIG. 10 is referred to. FIG. 10 is a perspective view of a liquid crystal display apparatus including a modified example of the sheet member 80 of the embodiment of the present invention. As shown in FIG. 10, a notch part 99 may be formed in the sheet member 90. The notch part 99 corresponds to the LCD cable (wiring members) covered with the copper (Cu) tape 94 (see FIG. 8). With this structure, it is possible to make the liquid crystal display apparatus 61 thin.

In addition, in the above-discussed embodiment of the present invention, the notebook type personal computer is discussed as an example of the electronic apparatus of the embodiment of the present invention. However, the present invention is not limited to this. For example, the present invention can be applied to other electronic apparatuses having liquid crystal display apparatuses, such as a PDA (Personal Digital Assistant), a mobile phone, a vide camera, or a digital camera.

Furthermore, in the above-discussed embodiment of the present invention, a liquid crystal panel is discussed as a display panel. However, the technique discussed in the embodiment of the present invention can be applied other kinds of the display panels such as a plasma panel or an organic EL (Electro-Luminescence) panel.

This patent application is based on Japanese Priority Patent Application No. 2008-84202 filed on Mar. 27, 2008, the entire contents of which are hereby incorporated herein by reference.

What is claimed is:

1. A display apparatus, comprising:
   a front cover;
   a display panel;
   a rear cover configured to receive, with the front cover, the display panel; and
   a conductive sheet member sandwiched between the display panel and the rear cover, the sheet member having a conductivity and shock absorption and vibration absorption properties,
   wherein a single sheet of the conductive sheet member is provided between the display panel and the rear cover, and
   wherein an area of a main surface of the conductive sheet member is substantially equal to an area of a main surface of the display panel, and the conductive sheet member is made of a metal having a configuration of an elastic member.

2. The display apparatus as claimed in claim 1,
   wherein a notch part is formed in the sheet member so as to correspond to a wiring member provided on the display panel.

3. The display apparatus as claimed in claim 1,
   wherein the sheet member is adhered to one of the rear cover and the display panel.

4. The display apparatus as claimed in claim 1,
   wherein the metal having the configuration of the elastic member includes one selected from a group consisting of aluminum (Al), stainless steel (SUS), and copper (Cu).

5. The display apparatus as claimed in claim 1,
   wherein the sheet member is formed of a gasket material.

6. The display apparatus as claimed in claim 5,
   wherein the gasket material is a metal.

7. The display apparatus as claimed in claim 1,
   wherein the sheet member is made of a composite material formed of a material having the conductivity and a material having the shock absorption and the vibration absorption properties.

8. The display apparatus as claimed in claim 7,
   wherein the material having the shock absorption and the vibration absorption properties is polyurethane.

9. The display apparatus as claimed in claim 1, further comprising:
   an antenna positioned between the front cover and the rear cover.

10. An electronic apparatus, comprising:
    a display apparatus; and
    a main body where the display apparatus is rotatably provided,
    wherein the display apparatus comprises:
    a front cover;
    a display panel;
    a rear cover configured to receive, with the front cover, the display panel; and
    a conductive sheet member sandwiched between the display panel and the rear cover, the sheet member having a conductivity and shock absorption and vibration absorption properties, wherein a single sheet of the conductive sheet member is provided between the display panel and the rear cover, and wherein an area of a main surface of the conductive sheet member is substantially equal to an area of a main surface of the display panel, and the conductive sheet member is made of a metal having a configuration of an elastic member.

* * * * *